United States Patent [19]
DiMarcello et al.

[11] Patent Number: 5,000,541
[45] Date of Patent: Mar. 19, 1991

[54] HERMETICALLY SEALED OPTICAL FIBERS

[75] Inventors: Frank V. DiMarcello, Clinton Township, Hunterdon County; Richard G. Huff, Basking Ridge; Paul J. Lemaire, Madison; Kenneth L. Walker, New Providence, all of N.J.

[73] Assignee: AT&T Bell Laboratories, Murray Hill, N.J.

[21] Appl. No.: 413,514

[22] Filed: Sep. 27, 1989

Related U.S. Application Data

[63] Continuation-in-part of Ser. No. 98,253, Sep. 18, 1987, abandoned.

[51] Int. Cl.$^5$ .................................................. G02B 6/16
[52] U.S. Cl. .................................. 350/96.3; 350/96.34; 427/163
[58] Field of Search ............... 350/96.23, 96.29–96.34; 427/163

[56] References Cited

U.S. PATENT DOCUMENTS

| | | | |
|---|---|---|---|
| 4,183,621 | 1/1980 | Kao et al. | 350/96.3 |
| 4,512,629 | 4/1985 | Hanson et al. | 350/96.3 |
| 4,575,563 | 3/1986 | Biswas et al. | 427/163 |

FOREIGN PATENT DOCUMENTS 57-209844 12/1982 Japan .
57-209845 12/1982 Japan .

OTHER PUBLICATIONS

R. Chaudhuri, S. and P. C. Schultz, "Hermetic Coating on Optical Fibers", Reliability Considerations in Fiber Optic Applications, Proceedings of SPIE, ed. D. K. Paul, vol. 717, Sep. 25–26, 1986, pp. 27–32, Cambridge, MA.
R. D. Maurer, "Fiber Fatigue: Present Status", *Proceedings of the Optical Fiber Conference*, Phoenix, AZ (1982), Paper No. WCC1, p. 38.
M. L. Stein, S. Aisenberg, and J. M. Stevens, "Ion Plasma Depostion of Hermetic Coatings for Optical Fibers", Physics of Fiber Optics, Advances in Ceramics, eds. B. Bendow and S. S. Mitra, vol. 2, American Ceramics Society (1981) pp. 124–133.
F. V. DiMarcello, C. R. Kurkjian, and J. C. Williams, "Fiber Drawing and Strength Properties", Optical Fiber Communications, ed. T. Li, vol. 1, Academic Press Inc. (1985) pp. 179–248.
L. L. Blyler, Jr., "Polymer Coatings for Optical Fibers Used in Telecommunications", *Polymer News*, vol. 8 (1981) pp. 6–10.
R. J. Charles, "Static Fatigue of Glass. II", *Journal of Applied Physics*, vol. 29, No. 11, Nov. 1958, pp. 1554–1560.

*Primary Examiner*—John D. Lee
*Attorney, Agent, or Firm*—B. S. Schneider

[57] ABSTRACT

A hermetically coated optical fiber is produced by contacting a hot fiber with an organic material such as acetylene. The heat of the fiber causes decomposition and results in a hermetic, carbonaceous coating. This coating is essentially impermeable to both water and hydrogen.

29 Claims, 3 Drawing Sheets

HERMETICALLY SEALED OPTICAL FIBERS

CROSS REFERENCE TO RELATED APPLICATION

This is a continuation-in-part of my co-pending application Ser. No. 098,253, filed Sept. 18, 1987, (now abandoned) which is hereby incorporated by reference.

BACKGROUND OF THE INVENTION

1. Technical Field

This invention relates to optical fiber and, in particular, to coated optical fiber.

2. Art Background

Typically, an optical fiber, after it is drawn from a preform, is coated with at least one, and typically two, polymer coatings. These coatings are applied by directing the fiber through a reservoir containing a suitable monomer, drawing the coated fiber through a die, and then curing the monomer into a polymer through exposure to radiation, e.g., ultraviolet radiation. The resulting coatings significantly enhance the mechanical and optical properties of the fiber.

Despite the advantages of polymeric coatings for optical fiber, they are generally permeable to water and hydrogen. This permeation by environmental water or by hydrogen generated during reactions of cable components in applications such as oil well logging or undersea systems has been found to have significant effects. In particular, the interaction of water with the surface of the silica fiber produces surface modifications that lower the fracture resistance of the fiber to applied stress. The interaction of the silica fiber with hydrogen produces an attenuation in the signal carried by the fiber. Thus, the reliability of the optical fiber, especially in adverse environments or the suitability of the fiber for applications where signal attenuation is not acceptable, necessitates a fiber with a hermetic coating alone or in combination with the typical polymer coatings.

Despite this desire, the deposition of hermetic coatings without substantial degradation of properties or substantial increase in cost is extremely difficult to attain. Various attempts have been made to achieve an economic, hermetic coating. For example, in one approach after draw the fiber is directed through a furnace containing a gas. The furnace induces pyrolytic decomposition of the gas which, in turn, produces a coating on the fiber. The composition of the fiber coating depends on the gas employed. Attempts have been made using organic gases to make hermetic coatings that are primarily carbon compositions. In all these attempts the coating was non-adherent and/or non-hermetic. Such attempts have been described in U.S. Pat. No. 4,512,629 issued Apr. 23, 1985, where $C_4H_{10}$ gas was employed; in the *SPIE Proceedings on Reliability Considerations in Fiber Optic Applications*, Sept. 25–26, 1986, Cambridge, Mass., p. 27, where a $C_4H_{10}$ gas was employed; in the *Proceedings of the Optical Fiber Conference*, Phoenix, Ariz. 1982, paper WCC1, where the gas utilized was not disclosed; and in *Physics of Fiber Optics, Advances in Ceramics*, eds. B. Bendow and S. S. Mitra, Vol. 2, pp. 124–133, American Ceramics Society, 1981, where an ion plasma deposition was utilized.

Compositions other than carbon have been produced using the previously described furnace approach for producing hermetic coatings by a gas phase reaction. For example, a combination of $C_4H_{10}$ and $TiCl_4$ has been utilized to obtain titanium carbide coatings while a combination of silane and ammonia has been utilized to obtain silicon oxynitride coatings. (See *SPIE Proceedings on Reliability Considerations in Fiber Optic Applications*, Sept. 25–26, 1986, Cambridge, Mass., p. 27, and U.S. Pat. No. 4,512,629, respectively.) The resistance to static fatigue of these coatings, i.e., on the order of $n=30-100$, for some applications is not entirely acceptable. Additionally, these coatings have typically been applied at draw rates slower than approximately 1 meter per second. Thus, even if the properties of these non-carbonaceous coatings are acceptable, the relatively slow draw speeds compared to typical speeds of 4-6 m/sec substantially increases cost.

Another approach suggested for producing a non-permeable coating employs the heat associated with the fiber after it is drawn to induce decomposition of a gas and subsequent fiber coating. (This approach is mentioned in U.S. Pat. No. 4,575,463 but specifics such as deposition conditions or useful coating precursor gases are not discussed.) Thus, although hermetically coated optical fibers for many applications are desirable, achieving acceptable, economic results is extremely difficult.

SUMMARY OF THE INVENTION

An excellent hermetic coating for an optical fiber is attained by inducing decomposition of a suitable organic gas at the fiber surface. For example, if the fiber directly after draw is treated with acetylene or benzene, decomposition at the fiber surface occurs, and a carbonaceous coating is produced that is strongly adherent, that does not substantially degrade optical properties, and which is essentially impermeable at room temperature to water and hydrogen.

Use of a combination of acetylene and a chlorine-containing gas such as chlorine or trichloroethylene has produced even better results. The initial fiber after coating has a loss of 0.38 dB/km at 1.3 $\mu$m and subjecting this fiber to hydrogen at elevated temperatures does not substantially increase this loss. The introduction of chlorine, it is believed, scavenges any hydrogen present during the coating procedure and therefore reduces losses associated with trapped hydrogen. A variety of organic materials produces the desired carbonaceous coating provided decomposition is induced at the fiber surface.

Additionally, it has been found that there is a significant amount of hydrogen containing gas trapped under the hermetic coating upon coating. For relatively non-permeable coatings it is possible that this gas has significant consequences.

DETAILED DESCRIPTION

Figure 1:
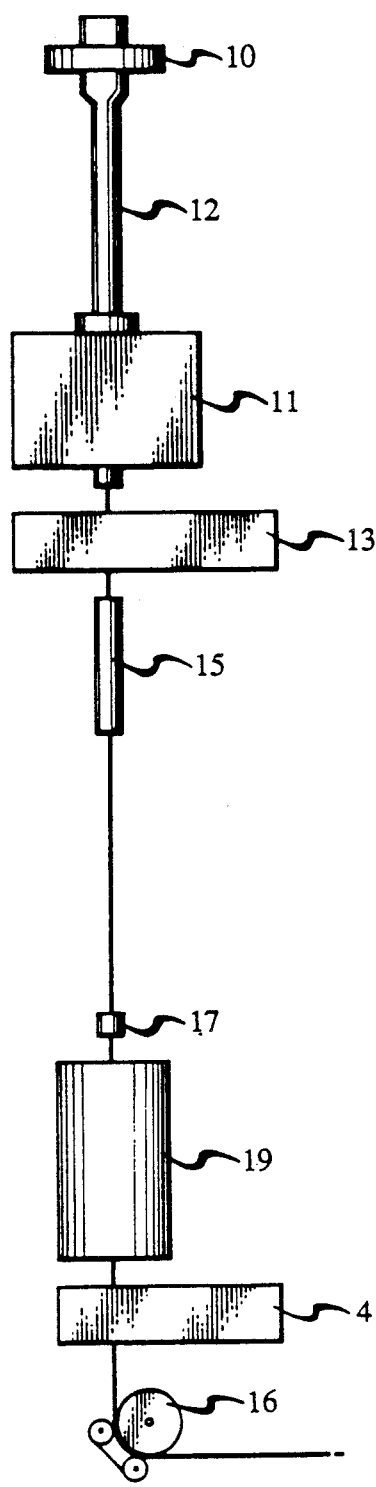
FIGS. 1-3 are illustrative of apparatuses suitable for the practice of the invention.

The procedure for drawing the fiber, and subsequently coating, if desired, with polymer coatings, is performable by conventional techniques. For example, the procedure described in F. V. DiMarcello, C. R. Kurkjian, and J. C. Williams, "Fiber Drawing and Strength Properties" in *Optical Fiber Communications*, Vol. 1, T. Li, ed., Academic Press Inc., 1985, is utilized to draw the fiber from a preform, and procedures such as described as in F. V. DiMarcello, C. R. Kurkjian, and J. C. Williams, supra, if desired, are utilized to coat the fiber with one or more polymer coatings. Suitable polymeric coatings are extensively discussed in L. L. Blyler, Jr., "Polymer Coatings for Optical Fibers Used in Telecommunications," *Polymer News*, Vol. 8, 1981, pp. 6–10.

The hermetic coating is formed after drawing the fiber from the perform but before organic polymer coatings are applied. The hermetic coating should interact directly with the surface of the glass fiber to produce the desired adhesion required for hermeticity. Thus, it is not appropriate to deposit the typical polymeric coating(s) before formation of the hermetic material.

The hermetic coatings involved in the inventive procedure are formed by the interaction of an organic material with the surface of the hot fiber. The fiber should be sufficiently hot to induce bonding between a carbon atom of the organic gas and a silicon atom of the glass fiber. Although the fiber temperature range required to achieve this result varies depending on (1) the organic gas being employed, (2) the heat of reaction of this gas with the silicon composition of the fiber and, (3) the specific thermal conditions associated with the fiber, typically temperatures in the range 700° C. to 900° C. are suitable.

The thermal conditions and the quality of the resulting coating are primarily influenced by the rate of fiber draw and the distance from the draw furnace at which the organic gas is interacted with the fiber surface. For example, if acetylene or benzene is utilized as the organic composition and interacted with the fiber at a distance of approximately 10 inches from the hot zone of a draw furnace having a temperature of 2300° C., draw rates below 3.5 meters per second do not generally produce an adherent coating. Coatings formed under the same conditions but with draw speeds between 3.5 and 6.5 meters per second produce excellent hermeticity. However, use of benzene combined with a source of chlorine allows draw speeds as slow as 2.5 meters per second.

The thermal conditions not only strongly affect the bonding of organic gas moieties to silicon in the glass fiber but also affect crosslinking between these bonded moieties. If no unsaturated bonds are present in the crosslinked network, a diamond-like structure is formed that is too brittle to afford acceptable mechanical properties for the final fiber and to open sufficiently to allow significant diffusion of water and hydrogen. The lack of unsaturated bonds is typically produced by an excessive fiber temperature. In the previous example involving acetylene, if draw speeds above 6.5 meters per second are utilized, an unacceptable diamond-like film is produced. (A diamond-like film is categorized by being optically transparent, electrically insulating, and primarily having only single bonded carbon as shown by Raman microprobe.) Parameters such as draw speed and contact point of the gas with the fiber are interrelated. The further the contact point from the draw furnace and/or the slower the draw speed the less the heat available for reaction. A control sample is utilized to determine a suitable contact point for a desired draw speed to obtain a hermetic, non-diamond coating.

Although a variety of organic materials lead to advantageous coatings, the level of permeability to hydrogen and/or water varies somewhat. Alkynyls, e.g., lower alkynyls such as acetylene or aryls such as benzene, appear to yield the lowest degree of permeability. It is believed that this result occurs because the reaction of triple bonds in the acetylene or double bonds in the benzene configuration upon pyrolysis yields a crosslinked network having unsaturated bonds and because this crosslinking reaction is exothermic. The heat liberated upon breaking of the triple or aromatic bond contributes to the bonding of the carbon of the acetylene to the silicon of the glass. Additionally, it is believed the pyrolysis of benzene leads to fragment configurations that are geometrically advantageous for forming a crosslink network.

Nevertheless, alkyls, e.g., lower alkyls such as propane, and alkenyls, e.g., lower alkenyls such as butadiene, also yield materials that although more permeable to water and hydrogen still have a lack of permeability that is acceptable for many applications. The degree of hermeticity depends on the gas employed. Both the gas to which the coating is to be hermetic and the degree of this hermeticity are important. In applications for which attenuation is most significant permeation to hydrogen is the primary consideration. For these applications, it is desirable to maintain a hermeticity such that the loss measured during continuous exposure to 1 atm. of hydrogen at 1.24 micrometers and at the temperature of use increases less than 0.05 dB/kilometers over an exposure time period that is 1/140 of the desired fiber lifetime. For more demanding applications the loss should not increase more than 0.05 dB/km in an exposure time period shorter than 1/45 of the desired lifetime, and for the most demanding applications such as undersea telecommunications the loss should not increase more than 0.05 dB/km in an exposure time period shorter than 1/20 of the desired lifetime. The factors of 1/140, 1/45 and 1/20 correspond to a hydrogen permeation at the end of the fiber lifetime of 50 percent of saturation 20 percent, and 10 percent respectively (assuming a slow reaction of hydrogen with the fiber compared to the rate of diffusion of hydrogen through the coating.) In situations where a getterer is present in the fiber, greater permeation to hydrogen is acceptable. Indeed, for the most reactive getterers at low hydrogen concentration, e.g., $10^{-5}$ atm., experienced by fibers within some terrestrial cables a hermetic coating is not essential. However, even for the most reactive getterers at higher concentrations—above $10^{-3}$ atm. such as in undersea cable and above 0.5 atm. such as experienced in some applications involving cables susceptible to galvanic corrosion—it is desirable to employ a coating which in the absence of the getterer by the measurement described above undergoes a 0.05 dB/km increase no faster than 1/2000 and 1/140 the desired life respectively.

In applications where resistance to static fatigue is most significant, e.g., fibers to be used in severe mechanical conditions, permeation to water or OH radicals is the primary concern. In these applications the static fatigue stress corrosion susceptibility factor should be greater than 70, preferably greater than 150 and the tensile strength should be greater than 400,000 preferably greater than 500,000. It is also desirable for some applications that the combined criteria for static fatigue, tensile strength, and loss all be satisfied.

Irrespective of the organic material employed and the ultimate use, the object is to contact the fiber at a temperature that produces chemical bonding between carbon and silicon atoms and that produces a crosslinked carbon network having unsaturated bonds. (It is possible to introduce some entities other than carbon atoms into this network. However, generally such atoms decrease hermeticity relative to hydrogen permeation.

Thus, such non-carbon entities should be limited to a degree that unacceptable loss is not produced.)

It has been found that hydrogen containing entities are present under the hermetic coating after fiber drawing. The exact reason for this phenomenon has not been precisely determined. Possibly because the organic gas employed typically has hydrogen atoms, there is a tendency to trap some hydrogen gas under the hermetic coating/glass fiber boundary. Alternatively, reaction with hydrogen evolved from the glass fiber could be the cause. When the coating is hermetic or presents a barrier to diffusion of this trapped gas (i.e., the diffusion coefficient is greater than (K) $(2 \times 10^{-12} cm^2/sec))$ for a 1000 Angstrom thick coating at 250 degrees C, where K is the solubility of hydrogen in the coating divided by the solubility of hydrogen in silica, it is possible for it to have a sufficient residence time for substantial reaction with the fiber and degradation of fiber properties. That is, there is sufficient trapped hydrogen and the reaction rate with the fiber at the ambient temperature is sufficiently high relative to its outdiffusion rate through the fiber coating to produce undesirable losses.

Although for many applications the degradation due to trapped gas is acceptable, for more demanding applications such as undersea communication systems, it is desirable to prevent losses greater than 0.03 dB/km from this source. To achieve this goal, the level of trapped gas is reduced or it is removed before substantial reaction with the fibers. The reduction of trapped hydrogen or water is accomplished, for example, by introducing a gettering substance (e.g., chlorine, bromine and/or fluorine), for entities such as hydrogen atoms in the precursor gas. This introduction is advantageously accomplished by using a supplementary gas having chlorine, bromine and/or fluorine atoms. For example, in the use of acetylene, the acetylene is mixed with a gas such as trichloroethylene, carbon tetrachloride, or molecular chlorine. The level of trapped hydrogen and water through the presence of chlorine is substantially reduced.

At high chlorine levels, e.g., above 1:1 molar ratio of chlorine to acetylene or 1:10 molar ratio of trichloroethylene:acetylene, some chlorine is introduced into the hermetic coating and mechanical properties are to an extent degraded. The chlorine is advantageously removed by heating the fiber to temperatures in the range 900° C. to 1100° C. after hermetic coating but before further coating. Alternatively, the fiber is sequentially treated for a relatively short distance with (1) a mixture of a getter containing gas with organic gas, e.g., 2:1 trichloroethylene:acetylene and then (2) with organic gas, e.g., acetylene. The first gas combination introduces the getterer close to the fiber and the second augments the coating without incorporating excess chlorine.

It has also been found that the introduction of chlorine, iodine or fluorine in the reaction gas has an additional advantageous effect. In particular, the use of appropriate quantities of these gases enhances the tensile strength of the fiber. Typically, for concentrations between acetylene and chlorine in the above indicated range the tensile strength of the fibers generally are approximately 600 ksi as opposed to 500 ksi obtained without the addition of chlorine, iodine or fluorine. These halogens are advantageously introduced as molecular gases but it is also possible to introduce them as part of an organic material.

It has also been found that tensile strength is improved by utilizing a chamber having a length greater than 12 cm. Although the exact reason for this tensile strength enhancement is not known, it is believed that lengths greater than 12 cm induce deposition of material over a relatively wide temperature range. The material deposited as the fiber enters the vessel (at a higher temperature) produces carbonaceous material with excellent hermeticity. Later deposition at lower temperature (near the exit of the vessel) produces deposition of a graphitic material with lower hermeticity but with the attribute of increasing tensile strength. (The hermeticity of the underlying material is not compromised.) The existence of two graphitic materials of different morphology is postulated based on thermogravimetric analysis (TGA) indicating materials that evolve at different temperatures. The material evolving at lower temperature being the material deposited at lower temperatures.) It is believed that the material evolving at higher temperature for excellent hermeticity should be at least 400 Angstroms thick. (This thickness is based on an assumed density of 1.8 grams per cubic centimeter.) The phenomenon of two different observed morphologies based on TGA is also present where halogens as described above are utilized to increase tensile strength.

Another procedure for removing trapped hydrogen containing gas involves introducing a getterer in the fiber at a spatial location that does not degrade optical properties but allows reaction with the trapped gas. Generally, the introduction of dopants such as Al, Ge, and/or P or defects such as draw induced defects in the region that is a distance of more than 10 $\mu$m from the center of the core in a fiber having a cladding diameter of 125 $\mu$m and a core diameter of 8 $\mu$m allows reaction of the dopant or defect with the trapped gas but does not degrade optical properties.

The positioning of the chamber is advantageously done so that material is deposited on the optical fiber after it has been reduced to its final diameter. Deposition on the fiber in the region where the diameter is still decreasing produces unnecessary stresses with concomitant decrease in fiber strength.

Although the temperature associated with the fiber is sufficient to induce the desired reaction to form the coating, the use of an external furnace to supply some heat is not precluded. Nevertheless, the level of this supplemental heat should not be sufficient to prevent reaction between carbon atoms in the organic gas and silicon in glass fiber composition. If this surface reaction is prevented by excessive inducement of gas phase reaction, sufficient adherence and thus sufficient hermeticity is precluded. Additionally, even if bonding occurs, the particle formation associated with gas phase reactions tends to produce voids in the hermetic coating and thus tends to degrade its properties.

The concentration of the organic material in the vicinity of the fiber also affects the quality of the hermetic coating. If the chemical concentration becomes too high it is possible to produce a gas phase reaction, obtain an explosive mixture, and/or generate an excessive concentration of particles, while if the chemical concentration is too low hermetic coating is not achieved. It is possible for particle formation and build up to occur at the exhaust port. This build up is avoided by directing a flow of an inert gas, e.g., nitrogen from the opposite side of the reaction vessel onto the exhaust port. The size of the vessel employed to introduce the gas affects the results by affecting the flow pattern. For vessels greater than 1 inch in diameter, the flow pattern is such that the effective concentration at the fiber is lowered. Therefore, it is advantageous to use a vessel less than 1 inch in diameter. A controlled sample is easily employed to determine an appropriate flow rate for the conditions utilized.

The following examples are illustrative of conditions suitable for the practice of the inventive technique.

EXAMPLE 1

A draw tower configuration as schematically illustrated in FIG. 1 was employed. This draw tower included a preform feed mechanism, 10, a draw furnace, 11, a monitor for measuring fiber diameter, 13, a coating chamber, 15, a polymer coating die, 17, a curing station, 19, a coating diameter monitor, 4, and a capstan and takeup mechanism, 16. These components were conventional and have been described in F. V. DiMarcello, supra. A single mode collapsed fiber preform, 12, was inserted in the preform furnace. The furnace was heated to a temperature of approximately 2300 degrees Centigrade. Inlet and outlet purges of nitrogen were established by introducing a nitrogen gas flow of 2 l/min at inlet, 21 and 22, shown in the enlarged view (FIG. 2) of the reaction chamber. Additionally, the exhaust, 25, was initiated and a nitrogen flow through reactant inlet, 26, at a rate of 1.8 l/min was introduced. (The inlet and outlet gas purges prevented atmosphere oxygen from entering the reaction chamber and to an extent stripped the boundary layer accompanying the fiber.) The coating applicator for the final polymeric coating was filled with a conventional acrylate UV curable coating. The fiber was initially drawn and threaded through fiber diameter monitor, 13. The fiber was then threaded through stripper plates, 24 and 23, each having an opening of 0.100 inches with a spacing between the stripper plates of 0.25 inches. Fiber threading was continued through (1) the purge outlet, (2) the polymeric coating die, 17, of the coating applicator, (3) the curing station which had two UV lamps providing a power of approximately 300 watts/inch over a length of approximately 18 inches, and (4) the coating diameter monitor to the capstan and takeup mechanism.

The reaction chamber was positioned approximately 10 inches from the hot zone of the furnace and had a cylindrical reaction region measuring approximately 9 inches long with a diameter of approximately 0.4 inches. A composition containing acetylene, molecular chlorine, and molecular nitrogen having respective flow rates of 900 cc/min, 125 cc/min, and 1.8 l/min (measured utilizing an Applied Materials mass flow controller) was introduced into port, 26, as the fiber draw speed was increased to a rate of approximately 5 meters per second. (The fiber temperature as it entered the reaction chamber as measured with an optical pyrometer was approximately 880 degrees C.)

Approximately 9000 meters of fiber were drawn. A series of 10 centimeter lengths from this fiber was measured utilizing a tensile tester made by Instron Corporation. The average measured strength was approximately 600,000 psi. The stress corrosion susceptibility factor, n (see, R. J. Charles, *Journal of Applied Physics*, 29, 1554 (1958)), was approximately 216 as determined through static fatigue tests involving suspending a series of weights from the fiber.

A length of approximately 2 kilometers was placed in one atmosphere of hydrogen at 250 degrees Centigrade. The loss of transmitted light due to the 1.59 $\mu$m hydrogen peak was measured as a function of time. After a period, the loss no longer increased. The time to reach half of this loss was considered a measure of the hermeticity of the coating and was approximately 60 hours. This should be compared to a time period of 5 minutes for an identical fiber lacking the hermetic coating.

EXAMPLE 2

The procedure of Example 1 was followed except that no chlorine was introduced into the reaction chamber. The tensile strength of the fiber was measured by the procedure described in Example 1 and was approximately 500,000 psi.

EXAMPLE 3

Figure 2:
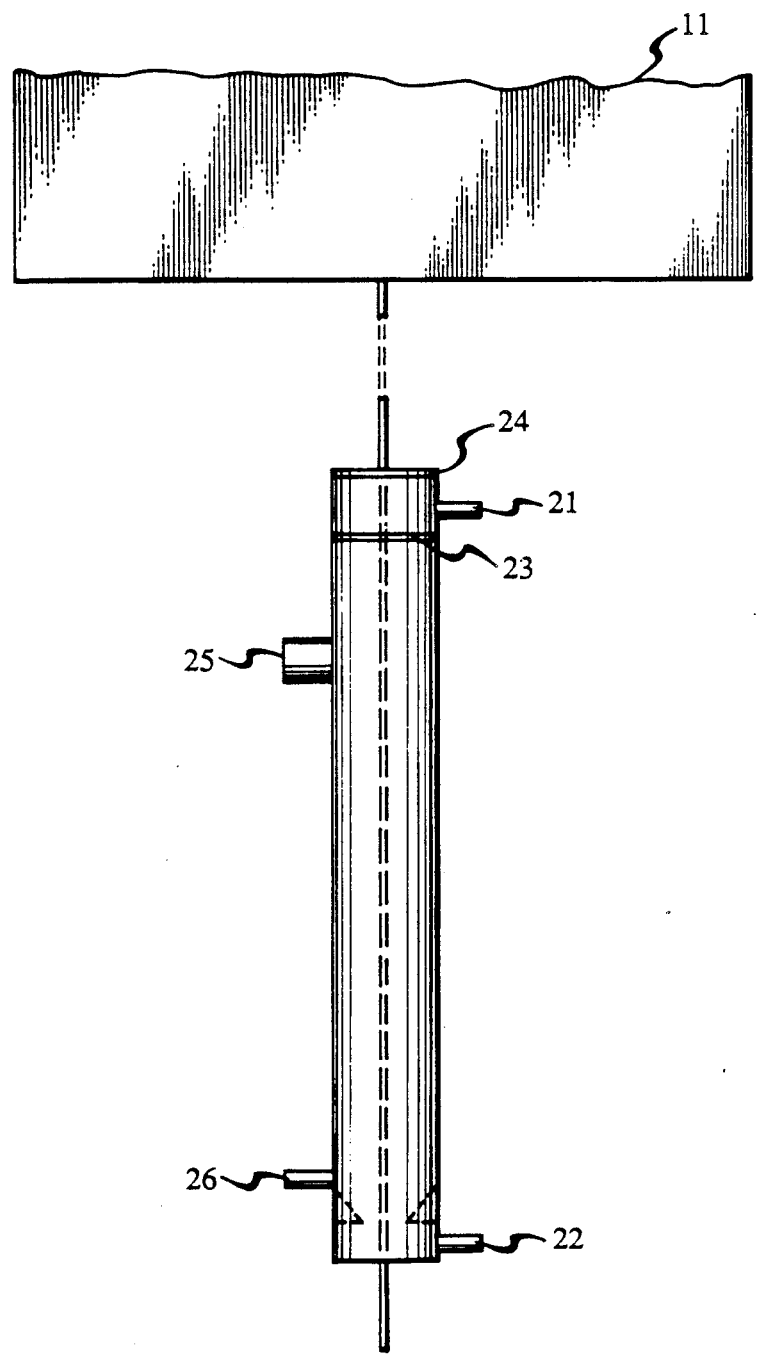
Figure 3:
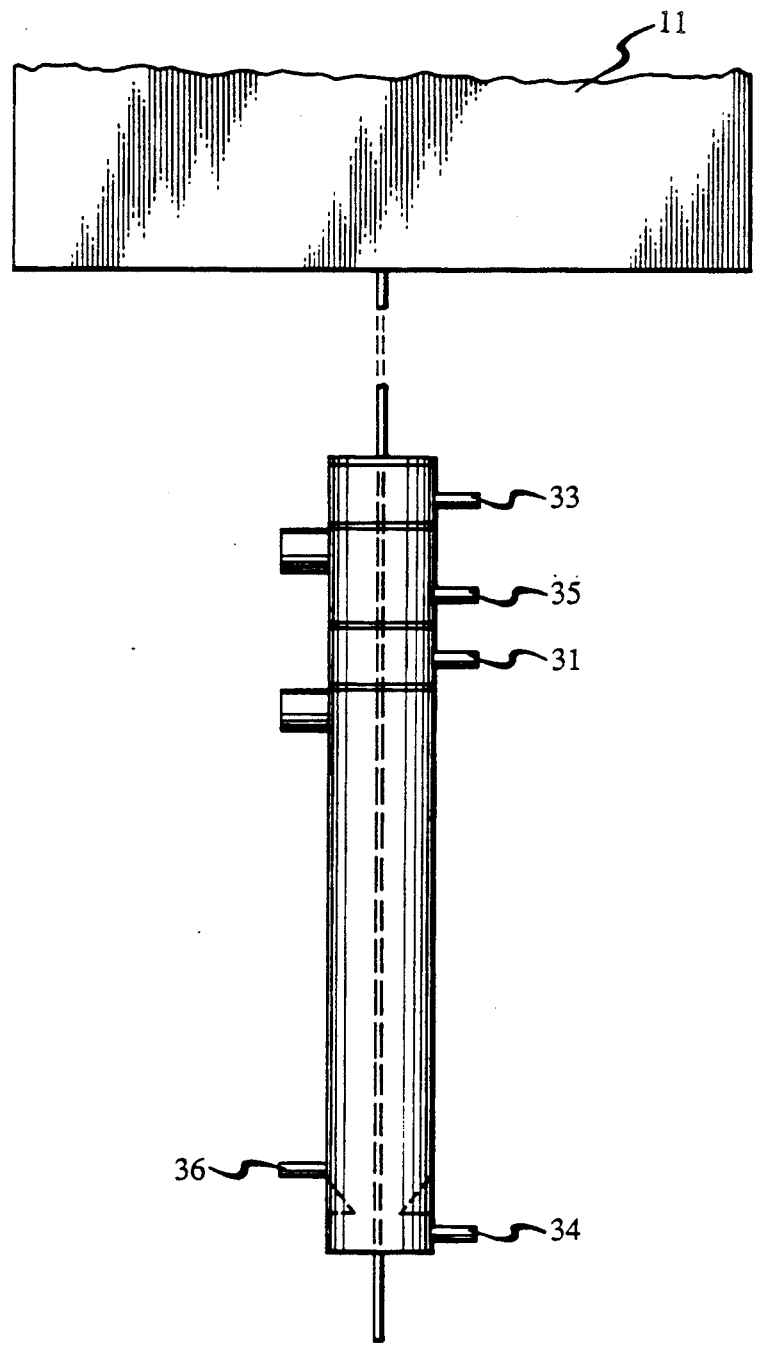

The procedure of Example 1 was followed except the two chamber coating apparatus shown in FIG. 3 was utilized rather than the one chamber apparatus shown in FIG. 2. Nitrogen flows, 33 and 34, were the same as described in Example 1. A nitrogen purge, 31, with a rate of approximately 500 cc/min was utilized to prevent intermixing of reactants from the separate chambers. A reaction mixture formed by bubbling nitrogen (250 cc/min) through a trichlorethylene bubbler at 60° C. and combining this flow with 50 cc/min of acetylene was introduced into the upper chamber at 35. Additionally, a mixture of acetylene (1 l/min) and nitrogen (2.5 l/min) was introduced at port, 36. The fiber was tested as described in Example 1. The static fatigue stress corrosion susceptibility factor, n, was 233, the tensile strength was 602,000 psi, and the half time to saturation of the elevated temperature hydrogen permeation test was approximately that obtained in Example 1.

We claim:

1. A process for producing a coated optical fiber comprising the steps of drawing a fiber from a heated glass body and contacting said fiber with a gas to induce the formation of a coating on said fiber characterized in that said gas comprises a carbonaceous composition, and said contact occurs when said fiber has a temperature sufficiently high to induce a reaction at the surface of said fiber that results in the formation of an adherent carbon coating comprising a crosslinked carbon network and is sufficiently low to avoid the formation of a diamond-like coating.

2. The process of claim 1 wherein said gas comprises an alkynyl.

3. The process of claim 2 wherein said alkynyl comprises acetylene.

4. The process of claim 3 wherein said gas includes a chlorine containing composition.

5. The process of claim 4 wherein said chlorine containing composition comprises a gas chosen from the group consisting of trichloroethylene and chlorine.

6. The process of claim 5 wherein said coated fiber is subjected to a heat treatment.

7. The process of claim 1 wherein said fiber undergoes said contact sequentially, first with a composition comprising a getterer containing gas and said carbonaceous composition and then with a second carbonaceous composition in the absence of said getterer.

8. The process of claim 7 wherein said carbonaceous composition comprises acetylene.

9. The process of claim 7 wherein said getterer comprises a chlorine containing composition.

10. The process of claim 9 wherein said chlorine containing composition comprises trichloroethylene.

11. The process of claim 7 wherein said second carbonaceous composition comprises acetylene.

12. The process of claim 11 wherein said carbonaceous composition comprises acetylene.

13. The process of claim 1 wherein said carbon coating is overcoated.

14. The process of claim 1 wherein said gas includes an entity chosen from the group consisting of chlorine, bromine, and fluorine.

15. The process of claim 1 wherein said fiber contains a getterer for hydrogen or water.

16. The process of claim 1 wherein said glass body comprises a fiber preform.

17. The process of claim 1 wherein said temperature is in the range 700 to 900 degrees C.

18. The process of claim 1 wherein said gas comprises benzene.

19. The process of claim 1 wherein said gas includes a member of the group consisting of chlorine, iodine, fluorine and carbon tetrachloride.

20. The product formed by the process of claim 1.

21. A process for producing a coated optical fiber comprising the steps of drawing a fiber from a heated glass body and contacting said fiber with a gas to induce formation of an hermetic coating characterized in that a getterer is introduced to remove hydrogen or water trapped by said coating.

22. The process of claim 21 wherein said getterer is in said fiber.

23. The process of claim 21 wherein said getterer is introduced in said gas.

24. The process of claim 23 wherein said getterer comprises a chlorine containing compound.

25. The process of claim 24 wherein said chlorine containing compound comprises a gas chosen from the group consisting of trichloroethylene and chlorine.

26. A process for producing a structure comprising a coated optical fiber said process comprising the step of drawing a fiber including a core and a cladding from a heated glass body and coating said fiber characterized in that a getterer for hydrogen or water is introduced into the periphery of said cladding.

27. The process of claim 26 wherein said coating is formed by subjecting said heated fiber to a gas at a temperature sufficient to induce formation of a non-diamond-like crosslinked carbon network.

28. A coated fiber comprising a glass fiber capable of guiding electromagnetic radiation and a coating characterized in that said coating is non-diamond-like, comprises a crosslinked carbon network and has an hermeticity such that the loss measured at 1.24 $\mu$m in 1 atm. of hydrogen and at the use temperature does not increase more than 0.05 dB/km in a time period shorter than 1/140 of the desired use period and such that the static fatigue, n, value is greater than 70.

29. The coated fiber of claim 28 wherein said time period is shorter than 1/45 the desired use period.

* * * * *